United States Patent  [11] 3,566,814

[72] Inventor Norman R. Pelton
 12127 York Ave., Haney, British Columbia, Canada
[21] Appl. No. 801,273
[22] Filed Feb. 24, 1969
[45] Patented Mar. 2, 1971
[32] Priority Feb. 6, 1968
[33] Canada
[31] 013,329

[54] PLANTING TOOL FOR TREE SEEDLINGS
8 Claims, 6 Drawing Figs.

[52] U.S. Cl. .................................................. 111/99, 172/21
[51] Int. Cl. .................................................. A01c 5/02, A01b 45/02
[50] Field of Search ........................................ 111/99, 92, 95, 4; 172/22, 21, 371

[56] References Cited
UNITED STATES PATENTS
| 2,207,741 | 7/1940 | Kimble | 111/99 |
| 2,865,315 | 12/1958 | Goldstein | 111/99X |
| 3,126,847 | 3/1964 | Morris | 111/99X |

Primary Examiner—Robert E. Pulfrey
Assistant Examiner—Stephen C. Pellegrino
Attorney—Fetherstonhaugh and Co.

ABSTRACT: A tool having a punch for forming a hole in the ground and a guide for directing a tree seedling into the hole.

PATENTED MAR 2 1971 3,566,814
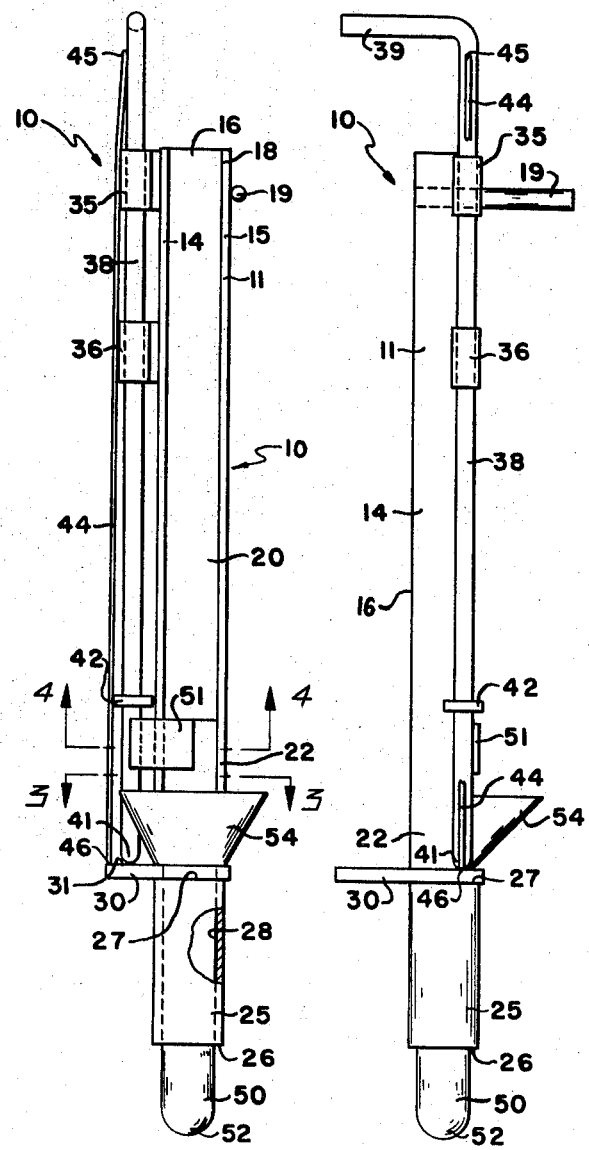
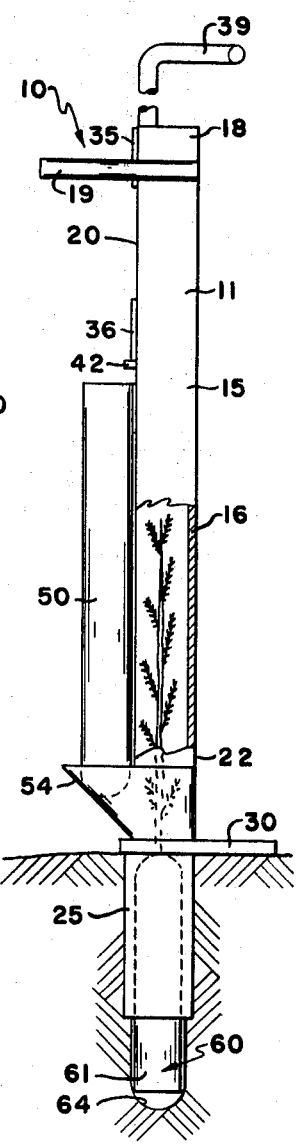
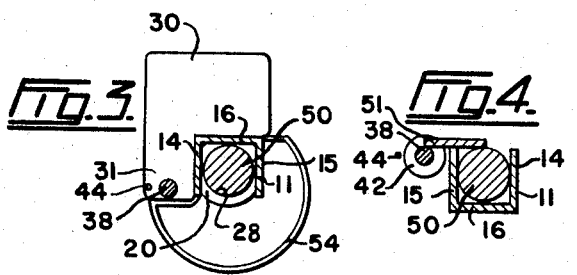
INVENTOR
NORMAN R. PELTON
BY
Fetherstonhaugh & Co
ATTORNEYS

PLANTING TOOL FOR TREE SEEDLINGS

BACKGROUND OF THE INVENTION

This invention relates to a tool adapted for use in the hand planting of the tree seedlings and more particularly, seedlings which have their roots encased in an earth container.

Logged or burned over areas of the forest usually are replanted by a group of men who are required to hike through the area and replant by hand. The men are equipped with mattocks and bags of tree seedlings and, as they move along, they dig holes in appropriate spots and insert the bare-root seedlings. Very often the country is rugged and the ground itself may be covered with brush or logging slash which makes it difficult to wield a tool such as a mattock. The planting must be done very carefully otherwise the seedlings will not survive and because of the rough terrain and the restricted space available in which to wield a tool, the men find it difficult to give the planting the attention it requires. In addition, such planting entails a great deal of hard work with frequent bending which the men find so tiring that they are inclined to be careless, particularly towards the end of a lengthy period at this tedious and time consuming task.

Attempts have been made to adapt planting tools of the type used in nurseries for this particular purpose but such tools are not well suited for use in reforestation. Often the ground is so hard or contains so many roots and stones, that it cannot readily be penetrated by conventional planters. Some planters have to be manipulated in such a way that it takes longer to plant seedlings than it does using a mattock. Other nursery planting tools are too heavy and cumbersome to carry through the rugged terrain of a logged off area and must be operated from a bent over position in the same manner as a mattock.

SUMMARY OF THE INVENTION

These and other disadvantages of conventional planting tools are overcome by the present device which is designed and constructed to facilitate the planting of tree seedlings, the roots of which are encased in a case-hardened mud container. The present tool enables the containerized seedlings to be dropped into a hole it has prepared to receive the seedling without the necessity of the user bending over. A hole can be made and a seedling planted with less effort and in a shorter time than it can be done using a mattock or conventional planter. The quality of planting is good since the roots are deposited in a vertical hole which is made to a depth where the soil is moist and only slightly larger than the seedling container. The chances are therefore better that the tree will survive. Since it is possible to punch holes with the present tool over brush or log covered ground which may be pitted with stones and roots, the spacing of the seedlings is improved and it is possible to plant an optimum number of trees per acre.

BRIEF DESCRIPTION OF THE DRAWING

FIG. 1 is a front elevation of the tool according to the present invention:

FIG. 2 is a side elevation;

FIG. 3 is a sectional plan view taken on the line 3-3 of FIG. 1;

FIG. 4 is a sectional plan view taken on the line 4-4 of FIG. 1;

FIG. 5 is an elevation of a containerized tree seedling; and

FIG. 6 shows the tree seedling being planted with the present tool.

DESCRIPTION OF THE PREFERRED EMBODIMENT

Referring to the drawings, the numeral 10 indicates generally a planting tool comprising a guide 11 which is approximately ½ feet in length so as to extend a suitable distance above the ground when in position of use. Guide 11 may be of any suitable material and cross section but is here shown as a length of metal channel having parallel side flanges 14 and 15 and a rear web 16 normal to said side flanges. Near the upper end 18 of the guide 11, a short handle 19 is secured to side flange 15 so as to project horizontally beyond the open side 20 of said guide.

Secured to the lower end 22 of the chaneled guide is a cylindrical tube 25 which is some 8 inches or so in length. Tube 25 has a lower edge 26, an upper edge 27, and a bore 28 which is longitudinally aligned with and enterable from the guide channel 11.

The planting tool 10 is provided with a foot plate 30 which preferably is suitably secured to the end 22 of the guide near the edge 27 of the tube. The horizontal plate 30 projects rearwardly of the web 16 and also a short distance laterally of the flange 14. This laterally projecting portion of the foot plate forms an anvil 31 alongside the flange 14.

The side flange 14 of the channel guide is fitted with vertically spaced sleeve bearings 35 and 36 which provide means for slidably and rotatably supporting a ram rod 38. Rod 38 has a rearwardly projecting handle 39 at its upper end and a hammer 41 at its lower end. Spaced a suitable distance above the hammer 41 is a stop washer 42 which is welded or otherwise secured to the cylindrical rod 38. The sleeve bearing 35 and 36 support the ram rod 38 parallel to the channel guide 11, slightly spaced from the flange 14, and vertically aligned with the anvil 31. Resilient means 44 preferably an elastic band, although a light spring may be used, is secured as at 45 to the rod 38. The opposite end of the resilient means 44 is secured as at 46 to the outer edge of the anvil 31, said means exerting resilient pressure normally to keep the hammer 41 in contact with the anvil 31 and to resist upward movement of the ram rod.

A cylindrical punch 50 is secured to the ram rod 38, preferably by means of a metal connector plate 51 which is welded to both these members so that the punch is disposed parallel to and slightly offset from the ram rod, see particularly FIG. 1, 3 and 4. Punch 50 slidably extends through the bore 28 of the tube and the diameter of the punch is such as to form a close fit with the tube bore. The lower end or tip 52 of the cylindrical punch is semispherical for reasons which will be made apparent later.

Secured to the lower end 22 of the channel guide 11 is a funnel 54 which extends upwardly above the foot plate 30. As shown best in FIG. 3, the funnel 54 encloses the open side 20 of the channel guide so as to direct an object sliding down said guide into the bore 28 of the tube.

Referring now to FIG. 5, the numeral 60 indicates the type of tree seedling the present tool particularly is designed to plant. The Douglas Fir or similar seedling 60 is grown in a nursery and, after a period of about one to three years, is removed from the ground for transporting to a forest area. Soon after removal from the ground at the nursery, the fragile roots of the seedling are encased in a cylindrical container 61 formed of soft mud or clay. The container 61 is then subjected to sufficient heat or drying to caseharden the clay so that the seedlings roots are protected from harm during transporting and planting.

In operation, the user carries the tool 10 in one hand, usually by gripping the ram rod handle 39. At the this time, the guide 11 and rod 38 are held against moving relative to one another by the tension applied by the resilient means 44. Thus, the hammer 41 is held against the anvil 31 and the punch 50 is supported lodged within the bore 28 of the tube with the rounded tip 52 projecting below the tube edge 26 as shown in FIGS. 1 and 2.

To punch a hole in the ground prior to planting a containerized seedling, the tool is raised and is plunged downwardly so that the protruding portion of the punch 50 and the tube 25 both enter the ground. If the ground is reasonably soft, the tool moves into the ground until stopped by the action of the foot plate 30 engaging the ground surface. As shown in FIG. 6, when the tool is plunged into soft ground in this manner, a hole 64 is punched which is substantially the same depth as the overall length of the container 61. If a hole is not punched to this depth by one thrust of the tool, which might be the case if the ground is hard, the channel guide 11 is held down by the handle 19 or the foot plate 30 and the ram rod 38 is lifted against the tension of the elastic or spring means 44, thus sliding the punch 50 further up into the lower end 22 of the channel guide. The rod 38 is then moved up and down as a plunger to thrust the tip 52 repeatedly into the ground and progressively form the hole. At the end of each downward stroke of the ram rod 38, the hammer 41 strikes the anvil 31 to drive the tube 25 into the hole immediately behind the tip 52 of the punch. The semispherical tip 52 serves to force the earth aside ahead of the reciprocating punch 50 in a manner which permits easy access into the ground of both the punch and the tube 25. If the tip 52 is pointed instead of rounded, a wedging action results which appears to compact the earth at the sides of the hole and this is believed to retard the entry of the tool into the ground.

Once the hole 64 is formed, a containerized seedling 60 is placed by the operator, using his other hand, in the upper end of the channel guide 11. The seedling is held, momentarily in the end 18 of the channel guide. While the operator holds down on the handle 19 with the same hand which supports the seedling, the rod 38 is raised until the stop collar 42 engages the underside o the sleeve bearing 36 whereupon said rod is rotated through approximately 45° to the position shown in FIG. 6. In this raised and rotated position, the tip 52 is placed against a part of the funnel 54, the ram rod then being supported so as to leave the guide 11 and tube 25 unobstructed by the punch 50.

The containerized seedling is then dropped to slide down the channel guide 11 and through the tube 25 until it strikes the bottom of the hole 64. The tool is then removed from the ground by lifting it up and over the top of the seedling. This is done by maintaining a downward force against the tension of the spring means 44 with the hand gripping the channel handle 19, or a foot on the plate 30, and at the same time, exerting a lift on the tool with the hand gripping the ram rod handle 39. When the tube 25 has been lifted in this manner, completely clear of the seedling 60, the downward pressure on the tool is removed. When this is done, the tension of the spring means 44 automatically forces the channel guide upward which results in the guide 11 rotating a partial turn as the side of the funnel 54 slides upward against the tip 52 of the punch. This movement of the guide 11 relative to the rod 38, aligns the punch with the tube, whereupon tension of the spring means 44 enters the punch into the tube until the hammer 41 again contacts the anvil 31. The tip of the punch is then projected below the edge 26 of the tube as shown in FIGS. 1 and 2 and the tool is again ready to be used to punch another hole.

Thus it will be seen that the tool is operated easily by one man who is not required to bend over to either form the hole or insert the tree seedling. The tool is readily carried on in one hand which leaves the user with one hand free to ease his movement over rough terrain and to get a containerized seedling ready for planting.

I claim:

1. A tool for planting tree seedlings comprising an elongated channel guide having a lower end, a tube on the lower end longitudinally aligned with the channel guide, a rod mounted for rotary and reciprocatory movement on the channel guide, a punch on the rod slidably extending through the tube, said punch being offset from and parallel to the rod, said rod being reciprocated to actuate the punch and progressively form a hole in the ground, said tube following the punch into the ground and remaining therein when said punch subsequently is removed from and disaligned with the tube to permit a tree seedling to be inserted into the hole by dropping it down the channel guide and through the tube.

2. A tool for planting tree seedlings as claimed in claim 1, and including an anvil on the channel guide, a hammer on the rod, said hammer striking the anvil when the rod is reciprocated to form a hole with the punch whereby the tube simultaneously is driven into the hole.

3. A tool for planting tree seedlings as claimed in claim 2, and including a foot plate on the lower end of the channel guide to limit penetration of the tube into the hole.

4. A tool for planting tree seedlings as claimed in claim 3, and including a funnel projecting above the foot plate to enclose an adjacent part of the channel guide and connect with the tube to guide the tree seedling into the tube.

5. A tool for planting tree seedlings comprising an elongated channel guide having a lower end, a tube on the lower end longitudinally aligned with the channel guide, a rod slidably and rotatably mounted on the channel guide, a punch on the rod slidably extending through the tube, said punch being parallel to and offset from the rod, a foot plate on the lower end of channel guide to limit penetration of the tube into the ground said foot plate including an anvil, said rod having a hammer adjacent the punch, resilient means on the rod and biasing the hammer towards the anvil, said rod being reciprocated to actuate the punch whereby progressively to form a hole in the ground, said hammer striking the anvil when the rod is reciprocated to drive the tube into the hole after the punch, said channel guide and tube providing a path of travel for a tree seedling when the punch is withdrawn from and disaligned with said tube.

6. A tool for planting tree seedlings as claimed in claim 5, and including a funnel projecting above the foot plate to guide the tree seedling from the channel guide into the tube, said funnel having a part which supports the punch withdrawn from and disaligned with said tube, and resilient means biasing the rod towards the lower end of the channel guide.

7. A tool for planting tree seedlings as claimed in claim 6, and including a handle on the channel guide and a handle on the rod.

8. A tool for planting tree seedlings as claimed in claim 5, in which said punch has a semispherical tip.